C. B. CHICKEN AND G. SCOTT.
VARIABLE SPEED GEARING.
APPLICATION FILED SEPT. 15, 1919.

1,398,417.

Patented Nov. 29, 1921.
2 SHEETS—SHEET 1.

Inventors:
Christopher B. Chicken
George Scott
By their attys

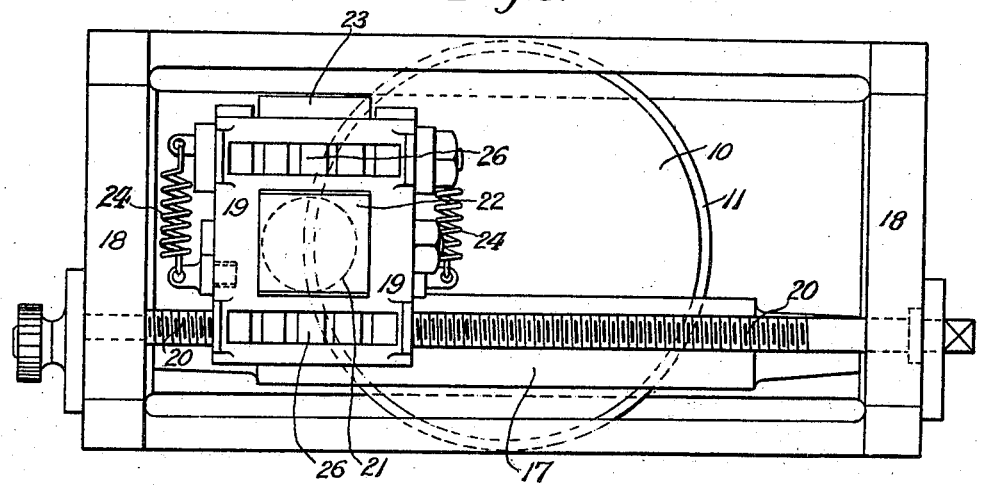
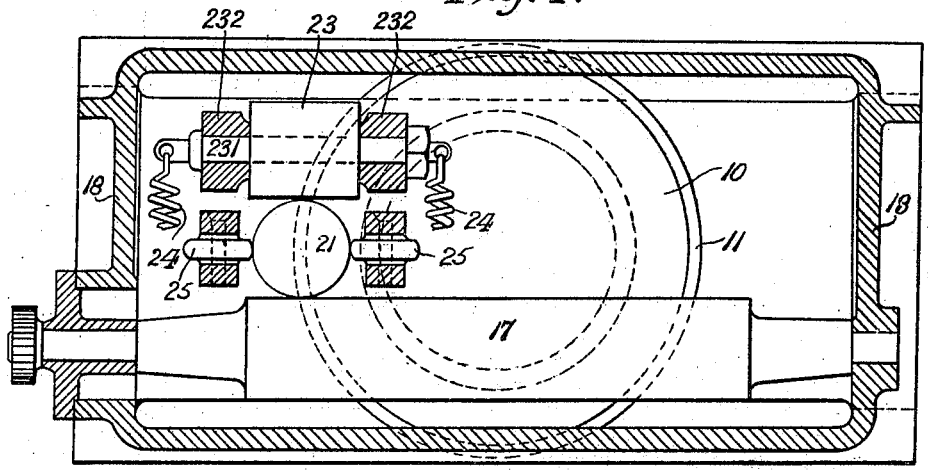

UNITED STATES PATENT OFFICE.

CHRISTOPHER BRUNSWICK CHICKEN AND GEORGE SCOTT, OF NEWCASTLE-UPON-TYNE, ENGLAND, ASSIGNORS TO SIR W. G. ARMSTRONG, WHITWORTH AND COMPANY, LIMITED, OF NEWCASTLE-UPON-TYNE, ENGLAND.

VARIABLE-SPEED GEARING.

1,398,417.     Specification of Letters Patent.     Patented Nov. 29, 1921.

Application filed September 15, 1919. Serial No. 323,390.

*To all whom it may concern:*

Be it known that we, CHRISTOPHER BRUNSWICK CHICKEN and GEORGE SCOTT, subjects of the King of Great Britain, residing at Elswick Works, Newcastle-upon-Tyne, England, have invented a new and useful Improvement in Variable-Speed Gearing, of which the following is a specification.

This invention relates to improvements in variable speed gearing in which a roller is driven by means of a disk or vice versa.

According to this invention a ball is so mounted in a carriage above a disk that it can be traversed in contact with the disk and the ball is maintained in contact with a roller extending the length of its travel across the disk by means of a second roller which is mounted on a shaft whose bearings are hinged to the carriage, springs being provided to maintain the roller in contact with the ball. On the side of the ball opposite to the disk is a third roller mounted in the carriage, which roller takes the thrust caused by a spring acting on the disk as will be hereinafter described. Upon the carriage are also mounted two other rollers for maintaining the ball in alinement when it is traversed across the disk. The carriage may be traversed by a screw thread engaging with a screw on the carriage. The disk is preferably mounted in a carrier capable of sliding in a sleeve supported on ball bearings and the disk is maintained in contact with the ball by means of a spring acting against the sleeve and a shoulder on the carrier.

When the ball is in the center of a driven disk no motion is transmitted, but if the ball is traversed toward the circumference of the disk in either direction the roller to be turned is driven with a constantly increasing speed in one or other direction according to the direction from the center of the disk in which the ball is traversed.

Figure 1:
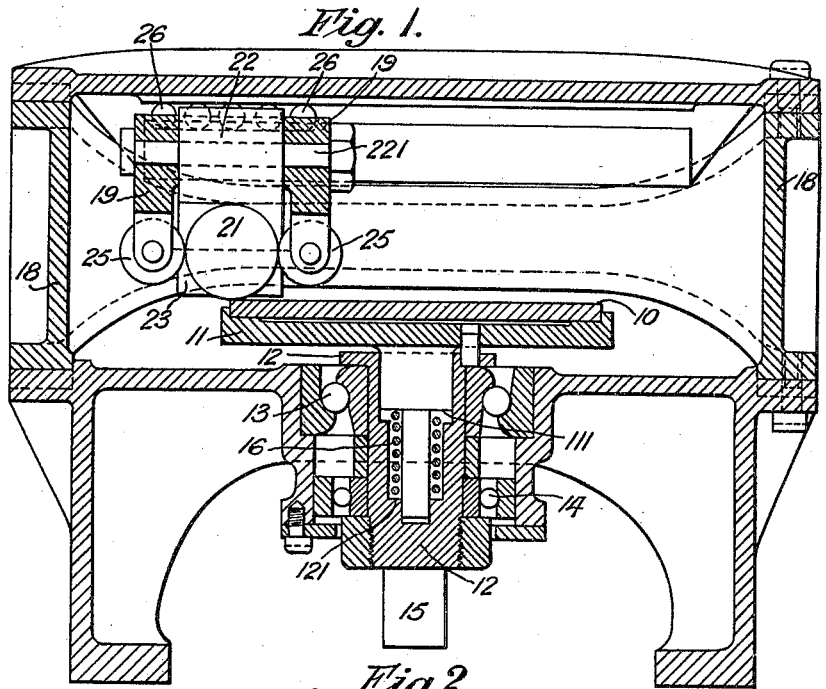
Figure 2:
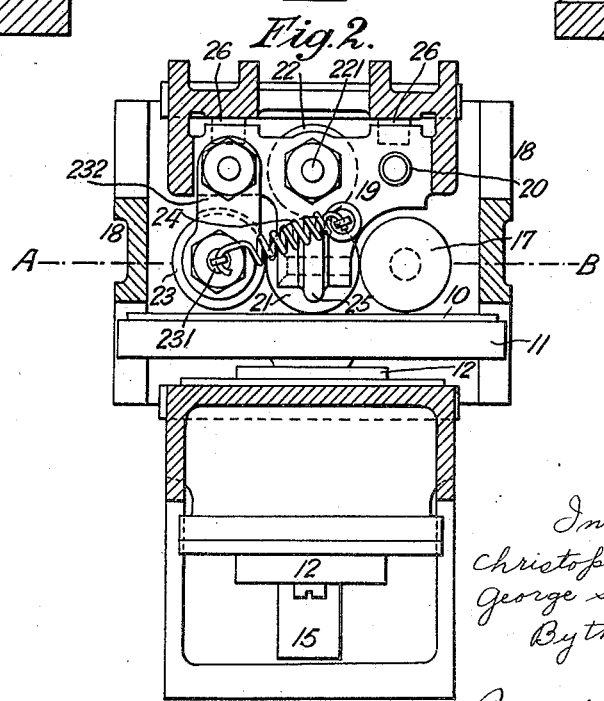

The accompanying drawings show apparatus made in accordance with this invention. Figure 1 is a longitudinal section, Fig. 2 a section at right angles to Fig. 1, Fig. 3 is a plan with the casing removed and Fig. 4 is a section on the line A—B, Fig. 2.

A disk 10 is mounted on a carrier 11 capable of sliding in a sleeve 12 which is mounted on balls arranged in two sets 13 and 14. A spindle 15 at the end of the sleeve 12 is driven at a constant speed which is imparted to the disk 10. The disk 10 is constantly forced upward by means of a spring 16 which is contained between shoulders 121 on the sleeve 12 and shoulders 111 on the carrier 11. 17 is a roller revolubly mounted in the ends of a casing 18, and 19 is a carriage which may be traversed along the casing by means of a screw spindle 20. A ball 21 is retained in the carriage 19 against the action of the spring 16 by a roller 22 mounted on a spindle 221 in the carriage and in contact with the roller 17 by a roller 23 on a spindle 231 supported by arms 232 pivoted to the carriage 19, springs 24 constantly tending to keep the roller 23 in contact with the ball 21. On the carriage 19 are two other rollers 25 which keep the ball 21 in alinement when it is traversed along the roller 17 and across the disk 10. On the carriage 19 are rollers 26 running on the top of the casing 18.

When the ball 21 is in the center of the driven disk 10 no motion is transmitted to the roller 17, but if the ball 21 is traversed in either direction the roller 17 is driven with constantly increasing speed in one or other direction according to the direction from the center of the disk in which the ball 21 is traversed.

What we claim is:—

1. In variable speed gearing, a disk, a carriage, a ball in the carriage and in contact with the disk, a roller in contact with the ball, a second roller in the carriage in contact with the ball opposite to the disk, a third roller in the carriage in contact with the ball opposite to the first roller, and means for traversing the carriage along the first roller.

2. In variable speed gearing, a disk, a carriage, a ball in the carriage and in contact with the disk, a roller in contact with the ball, a second roller in the carriage in contact with the ball opposite to the disk, a third roller on an axle in the carriage, a spring connected to the axle and tending to maintain the ball in contact with the first roller, and means for traversing the carriage along the roller.

3. In variable speed gearing, a disk, a carriage, a ball in the carriage, a spring tending to maintain the disk in contact with the ball, a roller in contact with the ball, a second roller in the carriage in contact with the ball opposite to the disk, a third roller in the carriage in contact with the ball opposite to the first roller, and means for traversing the carriage along the roller.

4. In variable speed gearing, a disk, a carriage, a ball in the carriage, a spring tending to maintain the disk in contact with the ball, a roller in contact with the ball, a second roller in the carriage in contact with the ball opposite to the disk, a third roller on an axle in the carriage, a spring connected to the axle and tending to maintain the ball in contact with the first roller, and means for traversing the carriage along the roller.

5. In variable speed gearing, a disk, a carriage, a ball in the carriage and in contact with the disk, a roller in contact with the ball, a second roller in the carriage in contact with the ball opposite to the disk, a third roller in the carriage in contact with the ball opposite to the first roller, two other rollers in the carriage adapted to maintain the ball in alinement and means for traversing the carriage along the roller.

6. In variable speed gearing, a disk, a carriage, a ball in the carriage and in contact with the disk, a roller in contact with the ball, a second roller in the carriage in contact with the ball opposite to the disk, a third roller on an axle in the carriage, a spring connected to the axle and tending to maintain the ball in contact with the first roller, two other rollers in the carriage adapted to maintain the ball in alinement, and means for traversing the carriage along the roller.

7. In variable speed gearing, a disk, a carriage, a ball in the carriage, a spring tending to maintain the disk in contact with the ball, a roller in contact with the ball, a second roller in the carriage in contact with the ball opposite to the disk, a third roller on an axle in the carriage, a spring connected to the axle and tending to maintain the ball in contact with the first roller, two other rollers in the carriage adapted to maintain the ball in alinement, and means for traversing the carriage along the roller.

In testimony that we claim the foregoing as our invention, we have signed our names this 26th day of August 1919.

CHRISTOPHER BRUNSWICK CHICKEN.
GEORGE SCOTT.